United States Patent
Nagashima et al.

(10) Patent No.: US 7,121,659 B2
(45) Date of Patent: Oct. 17, 2006

(54) WATER DISPERSION AND INK JET RECORDING INK

(75) Inventors: Shigeki Nagashima, Wakayama (JP); Nobuyuki Takizawa, Wakayama (JP)

(73) Assignee: Kao Corporation, Tokyo (JP)

( * ) Notice: Subject to any disclaimer, the term of this patent is extended or adjusted under 35 U.S.C. 154(b) by 229 days.

(21) Appl. No.: 10/875,337

(22) Filed: Jun. 25, 2004

(65) Prior Publication Data

US 2005/0012797 A1    Jan. 20, 2005

(30) Foreign Application Priority Data

Jun. 27, 2003    (JP)    ............................. 2003-185441

(51) Int. Cl.
*B41J 2/17*    (2006.01)
*G01D 11/00*    (2006.01)

(52) U.S. Cl. .................... 347/100; 347/95; 523/160

(58) Field of Classification Search ................ 347/100, 347/101, 95, 96; 106/31.6, 31.27, 31.13; 523/160
See application file for complete search history.

(56) References Cited

U.S. PATENT DOCUMENTS

| | | | |
|---|---|---|---|
| 6,011,098 A | 1/2000 | Kashiwazaki et al. | |
| 6,031,019 A | 2/2000 | Tsutsumi et al. | |
| 2003/0144378 A1 | 7/2003 | Mizushima et al. | |

FOREIGN PATENT DOCUMENTS

| | | | |
|---|---|---|---|
| EP | 0 791 610 A2 | 8/1997 | |
| EP | 1059341 A1 | 12/2000 | |
| EP | 1 172 421 A1 | 1/2002 | |
| EP | 1 273 637 A1 | 1/2003 | |
| EP | 1323789 A1 | 7/2003 | |
| JP | 6-306317 | 11/1994 | |
| JP | 2000-144031 | 5/2000 | |
| JP | 2004-2662 | 1/2004 | |
| WO | WO00/39226 | 6/2000 | |

*Primary Examiner*—Manish S. Shah
(74) *Attorney, Agent, or Firm*—Oblon, Spivak, McClelland, Maier & Neustadt, P.C.

(57) ABSTRACT

The present invention relates to an aqueous ink for ink jet recording and a water dispersion for ink jet recording, including water-insoluble vinyl polymer particles containing a colorant, the water-insoluble vinyl polymer being a water-insoluble vinyl polymer obtained by polymerizing a monomer mixture of:

(A) a monomer represented by the formula (I):

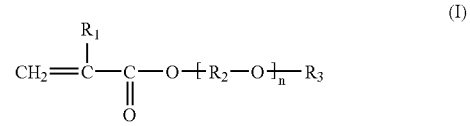

wherein $R_1$ represents a hydrogen atom or a lower alkyl group, $R_2$ represents an alkylene group having 2 to 18 carbon atoms or an alkylene group having 2 to 4 carbon atoms in which a phenyl group is substituted for a hydrogen atom thereof, n denotes a number from 2 to 30 and $R_3$ represents a straight or branched alkyl group having 8 to 30 carbon atoms;

(B) a monomer containing a salt-forming monomer; and
(C) a hydrophobic monomer.

20 Claims, No Drawings

WATER DISPERSION AND INK JET RECORDING INK

FIELD OF THE INVENTION

The present invention relates to a water dispersion and an aqueous ink for ink jet recording.

BACKGROUND OF THE INVENTION

An ink jet recording system is a recording system in which ink liquid droplets are jetted directly on a recording member from very fine nozzles and made to adhere to the recording member to obtain characters and images. This system has not only the advantage that the device to be used has a low noise and good operability but also has the advantage that coloration is easy and plain paper can be used as recording members and is therefore widely used. As ink used for an ink jet printer, pigment or hydrophobic dye type ink has been developed or used in recent years to improve water fastness and light fastness.

However, the pigment or hydrophobic dye ink scarcely remains on the surface of plain paper, posing a problem as to reduced optical density. Also, there is the problem that if the content of a pigment or a hydrophobic dye is increased in an ink formulation, the viscosity of ink is increased, giving rise to the problem concerning a deterioration in ink jetting ability and preserving stability.

In pigment ink, it is proposed, for example, that a polymer containing a polyethylene glycol (meth)acrylate monomer and α,β-ethylenic unsaturated carboxylic acid is added in order to improve printing quality and optical density (JP-A 6-306317 and the equivalent U.S. Pat. No. 6,011,098) and that a polymer dispersant containing a polyethylene glycol (meth)acrylate monomer or a poly(trimethylene glycol) (meth)acrylate monomer (JP-A 2000-144031) and the like is added to improve dispersibility and preserving stability. It is also proposed that macromer is compounded to improve high light fastness and high optical density (WO-A 00/39226 and the equivalent EP-A 1059341). Moreover, for example, aqueous ink containing a water dispersion of polymer particles of a water-insoluble vinyl polymer of a monomer using a combination of an ethylene oxide and a propylene oxide which ink has excellent water fastness, rub fastness and dispersion stability is proposed (JP-A 2004-2662 and the equivalent EP-A 1323789).

SUMMARY OF THE INVENTION

The present invention relates to a water dispersion for ink jet recording, including water-insoluble vinyl polymer particles containing a colorant, the water-insoluble vinyl polymer being a water-insoluble vinyl polymer obtained by polymerizing a monomer mixture of:
(A) a monomer represented by the formula (I):

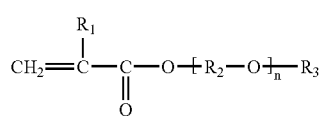

wherein $R_1$ represents a hydrogen atom or a lower alkyl group, $R_2$ represents an alkylene group having 2 to 18 carbon atoms or an alkylene group having 2 to 4 carbon atoms in which a phenyl group is substituted for a hydrogen atom thereof, n denotes a number from 2 to 30 and $R_3$ represents a straight or branched alkyl group having 8 to 30 carbon atoms;
(B) a monomer containing a salt-forming monomer; and
(C) a hydrophobic monomer.

The present invention also relates to an aqueous ink for ink jet recording, including the above shown water dispersion and then use of the aqueous ink for ink jet recording.

DETAILED DESCRIPTION OF THE INVENTION

However, in the aforementioned preceding prior documents, the polymer obtained by copolymerizing terminal hydroxyl groups (—OH) with oxyethylene groups or contained (meth)acrylate monomers as hydrophilic monomers easily penetrates into plain paper because the polymer itself becomes highly hydrophilic, giving rise to the problem that optical density is dropped. Also, because the terminal hydroxyl group raises the viscosity of the ink and therefore it becomes difficult to secure stable jetting ability.

Also, the polymer obtained by copolymerizing a (meth)acrylate monomer containing oxypropylene group slightly remains on plain paper. However, the polymer has the problem that optical density is not much high and the polymer is strongly hydrophobic, leading to reduced preserving stability.

The present invention relates to a water dispersion and an aqueous ink for ink jet recording, which enables high optical density in plain paper, is excellent in preserving stability, dispersing stability and rub fastness and can be less viscous.

In the ink jet recording aqueous ink of the present invention, the term "aqueous" means that the ratio of water in all solvents is the largest and the ratio of water may be 100%. A mixture of water and one or two or more organic solvents is also included in the aqueous solvents insofar as it satisfies the above requirements.

The ink jet recording water dispersion and aqueous ink of the present invention contain a water dispersion of a water-insoluble vinyl polymer having a colorant.

There is no particular limitation to the particle structure of the water-insoluble vinyl polymer particles containing a colorant insofar as these particles are formed of at least the colorant and the water-insoluble vinyl polymer. Examples of the particle structure include a particle structure in which the colorant is included in the water-insoluble vinyl polymer, a particle structure in which the colorant is uniformly dispersed in the water-insoluble vinyl polymer and a particle structure in which although the colorant is included in the water-insoluble vinyl polymer, a part of the colorant is exposed from the surface of the particle.

<Colorant>

As the colorant, pigments and hydrophobic dyes are preferable from the viewpoint of water fastness. The pigments may be either organic pigments and inorganic pigments. Also, an extender pigment may be combined according to the need. Examples of the extender pigment include silica, calcium carbonate and talc.

Examples of the organic pigment include azo pigments, disazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Preferable and specific examples of the organic pigment include C.I. Pigment Yellow 13, 17, 74, 83, 97, 109, 110, 120, 128, 139, 151, 154, 155, 174, 180, C.I. Pigment Red 48, 57:1, 122, 146, 176, 184, 185, 188 and 202, C.I. Pigment Violet 19 and 23, C.I. Pigment Blue 15, 15:1, 15:2, 15:3, 15:4, 16 and 60 and C.I. Pigment Green 7 and 36.

Examples of the inorganic pigment include carbon black, metal oxides, metal sulfides and metal chlorides. Among these compounds, carbon black is preferable. Examples of the carbon black include furnace black, thermal lamp black, acetylene black and channel black and the like.

Any material may be used as the hydrophobic dye insofar as it can be compounded in the polymer particle and no particular limitation is imposed on the type of hydrophobic dye. Examples of the hydrophobic dye include oil-soluble dyes and disperse dyes. Among these dyes, oil-soluble dyes are preferable. The solubility of the hydrophobic dye is preferably 2 g/L and more preferably 20 to 500 g/L in the organic solvent used to dissolve the hydrophobic dye when the water-dispersion is produced from the viewpoint of compounding the dye efficiently in the polymer particle.

Although no particular limitation is imposed on the oil-soluble dye, examples of the oil-soluble dye include C.I. Solvent Black 3, 7, 27, 29, 34 and 45; C.I. Solvent Yellow 14, 16, 29, 56, 82 and 83:1; C.I. Solvent Red 1, 3, 8, 18, 24, 27, 43, 49, 51, 72 and 73; C.I. Solvent Violet 3; C.I. Solvent Blue 2, 4, 11, 44, 64 and 70; C.I. Solvent Green 3 and 7; and C.I. Solvent Orange 2 and the like from the viewpoint of hydrophobic characteristics. Dyes obtained by allowing water-soluble dyes to be solubilized in oil may be used.

Among these dyes, it is preferable to use C.I. Solvent Yellow 29 and 30 as a yellow dye, C.I. Solvent Blue 70 as a cyan dye, C.I. Solvent Red 18 and 49 as a magenta dye and C.I. Solvent Black 3 and 7 and nigrosine type black dyes as a black dye.

Examples of commercially available oil-soluble dyes include Nubian Black PC-0850, Oil Black HBB, Oil Black 860, Oil Yellow 129, Oil Yellow 105, Oil Pink 312, Oil Red 5B, Oil Scarlet 308, Vali Fast Blue 2606 and Oil Blue BOS (trade names; these products are manufactured by Orient Chemical Industries, Ltd.) and Neopen Yellow 075, Neopen Mazenta SE1378, Neopen Blue 807, Neopen Blue FF4012 and Neopen Cyan FF4238 (trade names; these products are manufactured by BASF Japan Ltd.).

<Water-Insoluble Vinyl Polymer>

The water-insoluble vinyl polymer is obtained by polymerizing a monomer mixture including (A) a monomer represented by the formula (I) (monomer (A)), (B) a basic group-containing monomer (monomer (B)) and (C) a hydrophobic monomer (monomer (C)). These monomers may be mixed in each necessary amount to make a composition. Monomers other than these monomers (A), (B) and (C) may be used within the range of the amount enough to attain the object of the present invention.

The monomer (A) is those represented by the formula (I). The use of the monomer (A) has the advantage that aqueous ink having high optical density and preserving stability can be obtained. This is considered to be because an alkyl group which is a terminal group of the monomer (A) tends to remain on the surface of paper, with the result that the monomer (A) can impart excellent dispersion stability to aqueous ink.

In the formula (I), $R_1$ represents a hydrogen atom or a lower alkyl group and is preferably a hydrogen atom or a methyl group from the viewpoint of polymerizing ability.

In the formula (I), $R_2$ is an alkylene group having 2 to 18 carbon atoms or an alkylene group having 2 to 4 carbon atoms with its hydrogen atom being substituted with a phenyl group. An alkylene group having 2 to 4 carbon atoms such as an ethylene group, propylene group or butylene group is preferable.

The value n is the average number of moles added and is a number from 2 to 30, preferably a number from 2 to 25 from the viewpoint of optical density and storage stability, even more preferably a number from 2 to 15 and even more preferably a number from 2 to 10. $nR_2$s may be the same or different. When they are different from each other, either block addition or random addition is allowed.

Though $R_3$ is a straight-chain or branched chain alkyl group having 8 to 30 carbon atoms, it is preferably an alkyl group having 8 to 22 carbon atoms from the viewpoint of high optical density and strange stability, more preferably an alkyl group having 8 to 18 carbon atoms and even more preferably octyl group, 2-ethylhexyl group, decyl group, dodecyl(lauryl) group, tetradodecyl(myristyl) group, hexadecyl(cetyl) group or octadecyl(stearyl) group from the viewpoint of high optical density and preserving stability.

Examples of the monomer (A) include an octoxypolyethylene glycol mono(meth)acrylate, octoxypoly(ethylene glycol.propylene glycol)mono(meth)acrylate, butoxypolyethylene glycol (meth)acrylate, butoxypoly(ethylene glycol.propylene glycol)mono(meth)acrylate, octoxypolyethylene glycolmono(meth)acrylate, octoxypoly(ethylene glycol.propylene glycol)mono(meth)acrylate, octoxypoly (ethylene glycol.butylene glycol)mono(meth)acrylate, lauroxypolyethylene glycol(meth)acrylate, lauroxypoly(ethylene glycol.propylene glycol)mono(meth)acrylate, stearoxypolyethylene glycol mono(meth)acrylate and stearoxypoly(ethylene glycol.propylene glycol)mono(meth)acrylate. These compounds may be used either singly or by mixing two or more.

The monomer (A) may be obtained by polymerizing the terminal (—OH) of an aliphatic alcohol with an alkylene oxide and by etherizing the polymerized terminal group (—OH) by an acid. Specific examples of commercially available monomer (A) include Light Acrylate EA-C manufactured by Kyoeisha Chemical Co., Ltd. and 50POEP-800B, PLE200 and PSE-400 manufactured by Nippon Oil & Fats Co., Ltd.

The content (based on raw material) of the monomer (A) in the above-mentioned monomer mixture used to polymerize the water-insoluble vinyl polymer is 1 to 45% by weight, preferably 2 to 35% by weight and more preferably 2 to 30% by weight from the viewpoint of optical density and ink viscosity.

The monomer (B) is preferably an anionic monomer or a cationic monomer. These anionic monomers and cationic monomers may be respectively used either singly or by mixing two or more.

Examples of the anionic monomer include one or more types selected from unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. These compounds may be used either singly or by mixing two or more.

Examples of the unsaturated sulfonic acid monomer include styrenesulfonic acid, 2-acrylamido-2-methylpropanesulfonic acid, 3-sulfopropyl(meth)acrylate and bis-(3-sulfopropyl)-itaconate. These compounds may be used either singly or by mixing two or more.

Examples of the unsaturated phosphoric acid monomer include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate. These compounds may be used either singly or by mixing two or more.

Among these anionic monomers, unsaturated carboxylic acid monomers are preferable and acrylic acids and methacrylic acids are more preferable from the viewpoint of optical density and preserving stability.

Examples of the cationic monomer include one or more types selected from unsaturated tertiary amine-containing vinyl monomers and unsaturated ammonium salt-containing vinyl monomers.

Examples of the unsaturated tertiary amine-containing monomer include N,N-dimethylaminoethyl(meth)acrylate, N,N-dimethylaminopropyl(meth)acrylate, N,N-diethylaminoethyl(meth)acrylate, N,N-dimethylaminopropyl(meth)acrylamide, N,N-dimethylarylamine, vinyl pyrrolidone, 2-vinylpyridine, 4-vinylpyridine, 2-methyl-6-vinylpyridine and 5-ethyl-2-vinylpyridine. These compounds may be used either singly or by mixing two or more.

Examples of the unsaturated ammonium salt-containing monomer include N,N-dimethylaminoethyl(meth)acrylate quaternary compounds, N,N-diethylaminoethyl(meth)acrylate quaternary products and N,N-dimethylaminopropyl (meth)acrylate quaternary products. These compounds may be used either singly or by mixing two or more.

Among these cationic monomers, N,N-dimethylaminoethyl(meth)acrylate, N,N-dimethylaminopropyl(meth)acrylamide and vinyl pyrrolidone are preferable.

The content (based on raw material) of the monomer (B) in the above-mentioned monomer mixture used to polymerize the water-insoluble vinyl polymer is 2 to 50% by weight, preferably 4 to 40% by weight and more preferably to 35% by weight from the viewpoint of optical density and preserving stability.

Examples of the hydrophobic monomer (C) include one or more monomers selected from (C-1) monomers having an alkyl group, an aryl group or a cyclic hydrocarbon group represented by the formula (II):

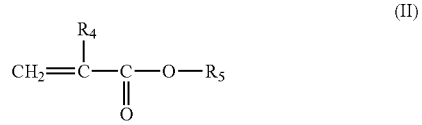

(II)

wherein $R_4$ represents a hydrogen atom or a lower alkyl group, $R_5$ represents an alkyl group having 1 to 22 carbon atoms, an aryl, alkylaryl or arylalkyl group having 6 to 22 carbon atoms or a cyclic hydrocarbon group having 3 to 22 carbon atoms, (C-2) aromatic ring-containing monomers represented by the formula (III):

(III)

wherein $R_6$ represents a hydrogen atom or a lower alkyl group, $R_7$ represents an aromatic hydrocarbon group having 6 to 22 carbon atoms and (C-3) macromers and the like. These compounds may be used either singly or by mixing two or more. The hydrophobic monomer (C) preferably contains one or more types selected from the aromatic ring-containing monomers (C-2) and the macromers (C-3) are more preferable from the viewpoint of optical density and rub fastness. The lower alkyl group represented by $R_4$ or $R_6$ is preferably a methyl group.

Examples of the monomer (C-1) having an alkyl group include meth(acrylates) in which the ester part is an alkyl group having 1 to 22 carbon atoms such as methyl(meth)acrylate, ethyl(meth)acrylate, (iso)propyl(meth)acrylate, (iso or tertiary)butyl(meth)acrylate, (iso)amyl(meth)acrylate, 2-ethylhexyl(meth)acrylate, (iso)octyl(meth)acrylate, (iso)decyl(meth)acrylate (iso)dodecyl(meth)acrylate, (iso)stearyl(meth)acrylate and behenyl(meth)acrylate. These compounds may be used either singly or by mixing two or more.

It is to be noted that the aforementioned (iso or tertiary) and (iso) means both the case where these groups are present and the case where these groups are not present. The case where these groups are not present means normal. Also, the (meth)acrylate means either a methacrylate or an acrylate. This is the same as follows.

Examples of the monomer (C-1) having an aryl group include benzyl(meth)acrylate and phenoxyethyl(meth)acrylate. These compounds may be used either singly or by mixing two or more.

The monomers (C-1) having a cyclic hydrocarbon group are monocyclic(meth)acrylates, dicyclic acrylates and tri- or more polycyclic(meth)acrylates having 3 or more carbon atoms. Specific examples of the monocyclic(meth)acrylates having 3 or more carbon atoms include cyclopropyl(meth) acrylate, cyclobutyl(meth)acrylate, cyclopentyl(meth)acrylate, cyclohexyl(meth)acrylate, cycloheptyl(meth)acrylate, cyclooctyl(meth)acrylate, cyclononyl(meth)acrylate and cyclodecyl(meth)acrylate. Specific examples of the dicyclic (meth)acrylates include isobornyl(meth)acrylate and norbornyl(meth)acrylate. Examples of the tricyclic(meth)acrylates include adamantyl(meth)acrylate. Among these compounds, cyclohexyl(meth)acrylate, isobornyl(methacrylate and adamantyl(meth)acrylate are preferable. These compounds may be used either singly or by mixing two or more.

The aromatic ring-containing monomer (C-2) is preferably one or more types selected from styrene, vinylnaphthalene, α-methylstyrene, vinyltoluene, ethylvinylbenzene, 4-vinylbiphenyl and 1,1-diphenylethylene from the viewpoint of water fastness. Among these compounds, one or more types selected from styrene, α-methylstyrene, vinyltoluene and vinylnaphthalene are more preferable from the viewpoint of optical density and rub fastness.

Examples of the macromer (C-3) include macromers having a polymerizable functional group at one terminal and a number average molecular weight of preferably 400 to 500,000 and more preferably 600 to 12,000.

Specific examples of the macromer include styrene type macromers having a polymerizable functional group at one terminal, silicone type macromers having a polymerizable functional group at one terminal, methylmethacrylate type macromers having a polymerizable functional group at one terminal, styrene/acrylonitrile type macromers having a polymerizable functional group at one terminal, butylacrylate type macromers having a polymerizable functional group at one terminal and isobutylmethacrylate type macromers having a polymerizable functional group at one terminal. Among these macromers, styrene type macromers having a polymerizable functional group at one terminal are preferable because they make it easy to form the water-insoluble vinyl polymer particles containing a colorant.

Examples of the styrene type macromers having a polymerizable functional group at one terminal include styrene homopolymers having a polymerizable functional group at one terminal and copolymers of styrene having a polymerizable functional group at one terminal and other monomers.

Among these styrene type macromers having a polymerizable functional group at one terminal, styrene type macromers having an acryloyloxy group or a methacryloyloxy group as the polymerizable functional group at one terminal are preferable from the viewpoint of dispersibility.

Examples of commercially available styrene type macromers include AS-6(S), AN-6(S) and HS-6(S) manufactured by Toagosei Co., Ltd.

The number average molecular weight of the macromer is measured by gel chromatography using 1 mmol/L of dodecyldimethylamine-containing chloroform and polystyrene as a standard material.

The content (based on raw material) of the hydrophobic monomer (C) in the above-mentioned monomer mixture used to polymerize water-insoluble vinyl polymer is 10 to 88% by weight, preferably 20 to 85% by weight and more preferably 25 to 80% by weight.

When the aromatic ring-containing monomer (C-2) is used as the hydrophobic monomer (C), the content (based on raw material) of the aromatic ring-containing monomer in the above-mentioned monomer (C), that is, the content (based on raw material) of the aromatic ring-containing monomer in the above-mentioned monomer mixture used to polymerize the water-insoluble vinyl polymer is preferably 0.1 to 70% by weight, more preferably 1 to 60% by weight and even more preferably 1 to 50% by weight from the viewpoint of rub fastness and ink viscosity.

When the macromer (C-3) is used as the hydrophobic monomer (C), the content (based on raw material) of the macromer in the above-mentioned monomer (C) is preferably 0.1 to 40% by weight, more preferably 1 to 30% by weight and even more preferably 1 to 20% by weight from the viewpoint of water fastness and rub fastness.

According to the below shown determination method described in Production Example, the weight average molecular weight (measured using the method of the water-insoluble vinyl polymer is preferably 3,000 to 300,000 and more preferably 5,000 to 200,000 from the viewpoint of optical density and jetting stability.

The water-insoluble vinyl polymer is produced by polymerizing the monomers (A), (B) and (C) by a known polymerization method such as a block polymerization method, solution polymerization method, suspension polymerization method and emulsion polymerization method. Among these polymerization methods, a solution polymerization method is preferable.

The solvent used in the solution polymerization method is preferably a polar organic solvent. In the case where the polar organic solvent is miscible with water, it may be mixed with water when used.

Examples of the polar organic solvent include aliphatic alcohols having 1 to 3 carbon atoms such as methanol, ethanol and propanol; ketones such as acetone and methyl ethyl ketone; and esters such as ethyl acetate. Among these compounds, methanol, ethanol, acetone, methyl ethyl ketone, methyl isobutyl ketone or mixed solutions of these solvents and water are preferable. Toluene may be used according to the need.

When the polymerization is carried out, a radical initiator may be used. As the radical initiator, azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile) and 1,1'-azobis(1-cyclohexanecarbonitrile) are preferable. Also, organic peroxides such as t-butyl peroxyoctoate, di-t-butyl peroxide and dibenzoyl oxide may be used.

The amount of the initiator is preferably 0.001 to 5 mol and more preferably 0.01 to 2 mol per 1 mol of the monomer mixture.

In the polymerization, a polymerization chain transfer agent may be further added. Examples of the polymerization chain transfer agent include mercaptans such as octylmercaptan, n-dodecylmercaptan, t-dodecylmercaptan, n-tetradecylmercaptan and 2-mercaptoethanol; xanthogen disulfides such as dimethylxanthogen disulfide and diisopropylxanthogen disulfide; thiuram disulfides such as tetramethylthiuram disulfide and tetrabutylthiuram disulfide; hydrocarbon halides such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, turbinolene, α-terpinene, γ-terpinene, dipentene, α-methylstyrene dimer, 9,10-dihydroanthracene, 1,4-dihydronaphthalene, indene and 1,4-cyclohexadiene; and unsaturated heterocyclic compounds such as 2,5-dihydrofuran. These polymerization chain transfer agents may be used either singly or by mixing two or more.

The condition under which the monomer is polymerized differs depending on, for example, types of radical initiator, monomer and solvent to be used and is therefore not determined in a wholesale manner. Generally, the polymerization temperature is preferably 30 to 100° C. and more preferably 50 to 85° C. and the polymerization time is preferably 2 to 24 hours. The polymerization atmosphere is preferably an atmosphere of inert gas such as nitrogen gas.

After the polymerization reaction is finished, the produced water-insoluble vinyl polymer may be isolated from the reaction solution by a known method such as reprecipitation and distillation of a solvent. Also, the obtained water-insoluble vinyl polymer may be purified by repeating reprecipitation or by removing unreacted monomers and the like by means of membrane separation, a chromatographic method or an extraction method.

<Water Dispersion of Water-Insoluble Polymer Particles and an Aqueous Ink Containing a Colorant>

The water dispersion of the water-insoluble vinyl polymer particles containing a hydrophobic dye as the colorant may be produced by a known emulsifying method. For example, the water-insoluble polymer and the hydrophobic dye are dissolved in an organic solvent, to which a neutralizing agent and water are then added to ionize a salt-generating group in the water-insoluble vinyl polymer. Then, a dispersion operation is carried out using a dispersing machine or a ultrasonic emulsifier according to the need and then the organic solvent is distilled to phase-transfer to a water system, whereby the water dispersion can be obtained.

The method of obtaining the water dispersion of the water-insoluble vinyl polymer particles containing a pigment as the colorant is preferably a method in which the water-insoluble vinyl polymer is dissolved in an organic solvent, a pigment, water and a neutralizing agent and, as required, a surfactant are added to the solution, the mixture is then kneaded, the mixture is then diluted with water and then the organic solvent is distilled to change the phase to a water system.

The amount of the colorant is preferably 20 to 1200 parts by weight, more preferably 50 to 900 parts by weight and even more preferably 65 to 600 parts by weight based on 100 parts by weight of the water-insoluble vinyl polymer from the viewpoint of optical density and from the viewpoint of compounding it with ease in the polymer particles.

As the organic solvent, alcohol type solvents, ketone type solvents and ether type solvents are preferable. Among these solvents, hydrophilic organic solvents are more preferable.

Examples of the alcohol solvent include methanol, ethanol, isopropanol, n-butanol, tertiary butanol, isobutanol and diacetone alcohol and the like.

Examples of the ketone type solvent include acetone, methyl ethyl ketone, diethyl ketone and methyl isobutyl ketone. Examples of the ether type include dibutyl ether, tetrahydrofuran and dioxane.

Among these solvents, methanol, ethanol, acetone, methyl ethyl ketone and methyl isobutyl ketone are preferable. Toluene may be combined according to the need.

As the neutralizing agent, an acid or a base may be used corresponding to the type of salt generating group. Examples of the acid include inorganic acids such as hydrochloric acid and sulfuric acid and organic acids such as acetic acid, propionic acid, lactic acid, succinic acid, glycolic acid, gluconic acid and glyceric acid. Examples of the base include tertiary amines such as trimethylamine and triethylamine, ammonia, sodium hydroxide and potassium hydroxide.

There is no particular limitation to the degree of neutralization. Generally, the resulting water dispersion is preferably in a neutral state, for example, in a pH range from 4 to 10.

Depending on the kind of the salt-forming group, the salt-forming group is neutralized to 100% with sodium hydroxide or acetic acid. The solubility of the neutralized water-insoluble vinyl polymer in water at 25° C. is preferably 10% by weight or less, more preferably 5% by weight or less and even more preferably 1% by weight or less from the viewpoint of decreasing the viscosity of the aqueous ink.

In the water dispersion and the aqueous ink, the average particle diameter of the water-insoluble vinyl polymer particles containing a colorant is preferably 0.01 to 0.50 µm, more preferably 0.02 to 0.30 µm and even more preferably 0.04 to 0.20 µm from the viewpoint of preventing clogging of nozzles and preserving stability. The average particle diameter corresponds to the "average particle diameter before storing" as shown in the examples and is measured by the method shown in the examples.

In the water dispersion and the aqueous ink for ink jet recording, the amount (solid content) of the polymer particles containing a colorant is adjusted to 0.5 to 30% by weight, more preferably 1 to 20% by weight and even more preferably 1 to 15% by weight in the aqueous ink from the view point of optical density and preserving stability.

The water dispersion for ink jet recording of the present invention may contain additives such as a water-soluble organic solvent (preferably a hydrophilic organic solvent), wetting agent, dispersant, antifoaming agent, mildew proofing agent, chelating agent and surfactant to obtain an aqueous ink.

When the ink jet recording aqueous ink contains a water-soluble organic solvent, it has an advantage in that it has high droughty resistance and effectively prevents freezing.

Any organic solvent may be used as the water-soluble organic solvent insofar as it has a solubility of 1% by weight or more in 25° C. water. As the water-soluble organic solvent, ethylene glycol, propylene glycol, diethylene glycol, triethylene glycol, polyethylene glycol, glycerin, polyglycerin, N-methyl-2-pyrrolidone and nitrogen-containing compounds such as 1,3-dimethylimidazolidinone. These compounds may be used either singly or by mixing two or more. Among these compounds, diethylene glycol, glycerin and 2-pyrrolidone are preferable. The amount of the water-soluble organic solvent in the aqueous ink is preferably 0.1 to 50% by weight and more preferably 0.1 to 30% by weight.

Examples of the wetting agent include polyhydric alcohols or their ethers such as ethylene glycol, propylene glycol, diethylene glycol, triethylene glycol, alkyl diols having 4 to 8 carbon atoms, polyethylene glycol, glycerin, polyglycerin, diethylene glycol diethyl ether, diethylene glycerin mono-n-butyl ether, acetates, N-methyl-2-pyrrolidone and nitrogen-containing compounds such as 1,3-dimethylimidazolidinone. The amount of the wetting agent in the aqueous ink is preferably 0.1 to 30% by weight and more preferably 0.1 to 20% by weight.

As the dispersant, an anionic, nonionic, cationic or amphoteric dispersant may be used.

An amount of water in a water dispersion and an aqueous ink for ink jet recording is preferably 40 to 90% by weight, more preferably 50 to 80% by weight.

The ink jet recording aqueous ink of the present invention is suppressed from penetrating into paper having a hydrophilic surface because the terminal group of the monomer (A) to be used to produce the water-insoluble vinyl polymer is much hydrophobic. It is possible to retain the colorant on the surface of paper efficiently, expected to obtain high optical density.

EXAMPLES

Production Examples 1 to 4 and Comparative Production Examples 1 and 2

20 parts by weight of methyl ethyl ketone, 0.03 parts by weight of a polymerization chain transfer agent (2-mercaptoethanol) and 10% by weight of each monomer (shown by parts by weight) shown in Table 1 were placed in a reactor and mixed. The atmosphere in the reactor was replaced sufficiently by nitrogen gas to obtain a mixed solution.

On the other hand, the remainder, namely, 90% by weight of each monomer (shown by parts by weight) shown in Table 1 was placed in a dropping funnel and then, 0.27 parts by weight of a polymerization chain transfer agent (2-mercaptoethanol), 60 parts by weight of methyl ethyl ketone and 1.2 parts by weight of 2,2'-azobis(2,4-dimethylvaleronitrile) were added and mixed, followed by replacing the atmosphere in the dropping funnel sufficiently by nitrogen gas to obtain a mixed solution.

The mixed solution in the reactor was raised to 75° C. with stirring in a nitrogen atmosphere and the mixed solution in the dropping funnel was gradually dripped in the reactor over 3 hours. After the dripping was finished, the solution temperature of the mixed solution was kept at 75° C. for 2 hours. Thereafter, a solution obtained by dissolving 0.3 parts by weight of 2,2'-azobis(2,4-dimethylvaleronitrile) in 5 parts by weight of methyl ethyl ketone was added to the mixed solution, which was then further ripened at 75° C. for 2 hours and at 85° C. for 2 hours to obtain a polymer solution.

A part of the resulting polymer solution was dried at 105° C. under reduced pressure for 2 hours to remove solvents thereby isolating the polymer. The weight average molecular weight of the polymer was measured by gel permeation chromatography using a polystyrene as a standard material and 60 mmol/L of phosphoric acid and 50 mmol/L of lithium bromide-containing dimethylformamide as a solvent.

The details of each compound shown in Table 1 are as follows;

Ethoxypolyethylene glycol monomethacrylate: Compound represented by the formula (I) in which n is 9, $R_1$ and $R_2$ are respectively a methyl group;

Octoxypolyethylene glycol monomethacrylate: Monomer represented by the formula (I) in which n is 6, $R_1$ is a methyl group and $R_2$ is a 2-ethylhexyl group.

Octoxypolyethylene glycol·polypropylene glycol monomethacrylate: Monomer which is represented by the formula (I) in which n is 6 (the average number of moles added of polyethylene glycol=4, the average number of moles added of polypropylene glycol=2), $R_1$ is a methyl group and $R_2$ is a 2-ethylhexyl group and in which an oxyethylene group and an oxyethylenepropylene group are added at random;

Lauroxypolyethylene glycol monomethacrylate: Compound represented by the formula (I) in which n is 4; $R_1$ is a methyl group and $R_2$ is a dodecyl group;

Stearoxypolyethylene glycol monomethacrylate: monomer represented by the formula (I) in which n is 9, $R_1$ is a methyl group and $R_2$ is an octadecyl group;

Polyethylene glycol monomethacrylate: Compound represented by the formula (I) in which n is 15, $R_1$ is a methyl group and $R_2$ is a hydrogen atom;

Methacrylic acid: Trade name: GE-110 (MAA), manufactured by Mitsubishi Gas Chemical Company, Inc.

2-Ethylhexyl methacrylate: Trade name: Acryl ester EH, manufactured by Mitsubishi Rayon Co., Ltd.

Styrene monomer: Trade name: Styrene Monomer, manufactured by NIPPON STEEL CHEMICAL CO., LTD.

Styrene macromer: Trade name: AS-6S (Styrene Macromer), manufactured by Toagosei Co., Ltd., number average added and dispersed in the solution by using a high-pressure homogenizer (uniform valve type).

120 parts by weight of ion exchange water was added to the obtained kneaded product and the mixture was stirred. Then, methyl ethyl ketone was removed at 60° C. under reduced pressure and a part of the water was further removed to obtain a water dispersion of pigment-containing vinyl polymer particles having a solid concentration of 20% by weight.

40 Parts by weight of the resulting water dispersion of pigment-containing vinyl polymer particles, 15 parts by weight of glycerin, 5 parts by weight of 2-{2-(2-butoxyethoxy)ethoxy}ethanol, 0.5 parts by weight of an EO adduct (n=10) of 2,4,7,9-tetramethyl-5-decyne-4,7-diol and 59.5 parts by weight of ion exchange water were mixed. The resulting mixed solution was filtered by a needle-less syringe (manufactured by Terumo Corporation) having a capacity of 25 mL and equipped with a 5 μm filter (acetyl cellulose film, outside diameter: 2.5 cm, manufactured by Fuji Photo Film Co., Ltd. to remove coarse particles, thereby obtaining aqueous inks having each composition shown in Table 2.

Next, the properties of the obtained aqueous ink were evaluated based on the following methods. The results are shown in Table 2.

(1) Ink Viscosity

The viscosity of each ink was measured at 20° C. using an RE80L type viscometer manufactured by Toki Sangyo (K.K.) at 100 r/min and evaluated according to the following evaluation standard.

(Evaluation Standard)

○: The viscosity of ink is less than 3.5 Pa·s.

Δ: The viscosity of ink is 3.5 Pa·s or more and less than 4.5 Pa·s.

TABLE 1

| | | | Production example | | | | Comparative example 1 | Comparative example 2 |
|---|---|---|---|---|---|---|---|---|
| | | | 1 | 2 | 3 | 4 | | |
| Type of monomer | (A) | Ethoxypolyethylene glycol monomethacrylate (n = 9) | 0 | 0 | 0 | 0 | 0 | 10 |
| | | Octoxypolyethylene glycol monomethacrylate (n = 6) | 10 | 0 | 0 | 0 | 0 | 0 |
| | | Octoxypolyethylene glycol/polypropylene glycol monomethacrylate (n = 6) | 0 | 10 | 0 | 0 | 0 | 0 |
| | | Lauroxypolyethylene glycol monomethacrylate (n = 4) | 0 | 0 | 10 | 0 | 0 | 0 |
| | | Stearoxypolyethylene glycol monomethacrylate (n = 9) | 0 | 0 | 0 | 10 | 0 | 0 |
| | | Polyethylene glycol monomethacrylate (n = 15) | 0 | 0 | 0 | 0 | 10 | 0 |
| | (B) | Methacrylic acid | 12 | 14 | 14 | 14 | 12 | 12 |
| | (C) | 2-ethylhexyl methacrylate | 22 | 20 | 20 | 20 | 22 | 22 |
| | | Styrene monomer | 46 | 46 | 46 | 46 | 46 | 46 |
| | | Styrene macromonomer | 10 | 10 | 10 | 10 | 10 | 10 |
| | | Weight average molecular weight | 41000 | 40000 | 30000 | 32000 | 40000 | 32000 |
| | | Neutrality (%) | 90 | 90 | 90 | 90 | 90 | 90 |

Examples 1 to 4 and Comparative Examples 1 and 2

5 Parts by weight of a polymer obtained by drying each polymer solution obtained in Production Examples 1 to 4 and Comparative Production Examples 1 and 2 under reduced pressure was dissolved in 45 parts by weight of methyl ethyl ketone. A neutralizing agent (aqueous 5N-sodium hydroxide solution) was added to the solution in a fixed amount to neutralize the salt-generating group. Further, 20 parts by weight of carbon black (C.I. Pigment·Black 7, manufactured by Cabot Specialty Chemicals, Inc) was x: The viscosity of ink is 4.5 Pa·s or more and less than 7.0 Pa·s.

(2) Preserving Stability

Using the aforementioned viscometer, viscosities of the ink were measured before the ink was stored and after the ink was stored at 70° C. for 14 days were determined. A dispersion stability of the ink was calculated from the obtained viscosities according to the following equation and then evaluated based on the following evaluation standard.

Preserving stability (%)=[(Viscosity after stored)/(viscosity before stored)]×100

(Evaluation Standard)

○: Preserving stability is 90% or more and 110% or less.

Δ: Preserving stability is more than 80% and less than 90%, or more than 110% and less than 120%.

x: Preserving stability is 80% or less or 120% or more.

(3) Optical Density

A commercially available ink jet printer (Model Number: EM900C) manufactured by Seiko Epson Corporation was used to carry out solid image printing on 5 commercially available copying paper (plain paper), which was then allowed to stand at 25° C. for 24 hours. Then, the optical density was measured by a Macbeth densitometer (Product Number: RD914, manufactured by Macbeth) and evaluated based on the following evaluation standard. And the average value is calculated.

Plain Paper:
1. Canon PB paper (obtained by Higashi Nihon),
2. Canon PB paper (obtained by Nishi Nihon)
3. XEROX 4200
4. Canon Office
5. Canon Brilliant White Printed letters having the optical density more than 1.35, preferably more than 1.40 are excellent.

(4) Rub Fastness

The aforementioned printer was used to carry out solid image printing on a commercially available copy paper, which was then dried at 25° C. for 24 hours. Thereafter, the print surface was strongly rubbed by a finger. The condition of the removal of the print image was evaluated based on the following evaluation standard.

(Evaluation Standard)

○: Almost no print image is removed and any place around the print image is not soiled.

Δ: Print image is removed a little and places around the print image and fingers are soiled a little.

x: Print image is considerably removed and places around the print image and fingers are soiled considerably.

(5) Average Particle Diameter and Dispersion Stability

The average particle diameter (hereinafter referred to as "average particle diameter before storage") of the colorant-containing polymer particles included in the ink was measured using a Laser Particle Analysis System ELS-8000 (Cumulant method) manufactured by Otsuka Electronics Co., Ltd. The ink was placed in a closed container, stored in a 60° C. thermostatic oven for one month and the average particle diameter (hereinafter referred to as "average particle diameter after storage") of the colorant-containing polymer particles in the same manner. As the index of the dispersion stability, the dispersion stability factor was calculated according to the following equation and evaluated based on the following standard.

Dispersion stability factor (%)=(Average particle diameter after storage)/(Average particle diameter before storage)×100

(Evaluation Standard)

○: Dispersion stability factor is 90% or more and 110% or less.

Δ: Dispersion stability factor is 70% or more and less than 90%, or 110% or more and less than 130%.

x: Dispersion stability factor is less than 70% or 130% or more.

TABLE 2

| | | Example | | | | Comparative example | |
|---|---|---|---|---|---|---|---|
| | | 1 | 2 | 3 | 4 | 1 | 2 |
| Ink Composition | Type of pigment-containing polymer | Production example 1 | Production example 2 | Production example 3 | Production example 4 | Comparative production example 1 | Comparative production example 2 |
| | Water dispersion of pigment-containing polymer particles (solid content 20%) | 40.0 | 40.0 | 40.0 | 40.0 | 40.0 | 40.0 |
| | Glycerine | 15.0 | 15.0 | 15.0 | 15.0 | 15.0 | 15.0 |
| | 2-[2-(2-butoxyethoxy)ethoxyl]ethanol | 5.0 | 5.0 | 5.0 | 5.0 | 5.0 | 5.0 |
| | EO adduct of 2,4,7,9-tetramethyl-5-decine-4,7-diol (n = 10) | 0.1 | 0.1 | 0.1 | 0.1 | 0.1 | 0.1 |
| | Ploxel XL2 (S) | 0.08 | 0.08 | 0.08 | 0.08 | 0.08 | 0.08 |
| | Ion exchange water | 39.87 | 39.87 | 39.87 | 39.87 | 39.87 | 39.87 |
| Mesuring items | Ink viscosity | o | o | o | o | X | o |
| | Preserving stability | o | o | o | o | X | o |
| | Optical density | 1.40 | 1.40 | 1.40 | 1.38 | 1.00 | 1.18 |
| | Rub fastness | o | o | o | o | Δ | o |
| | Dispersion stability | o | o | o | o | X | o |

As shown by the results in Table 2, it was found that all the aqueous inks obtained in Example had high optical density, were excellent in preserving stability and dispersion stability and also rub fastness. The ink obtained in Comparative Examples 1 had low optical density and deteriorated preserving stability.

The invention claimed is:

1. A water dispersion for ink jet recording, comprising water-insoluble vinyl polymer particles containing a colorant, the water-insoluble vinyl polymer being a water-insoluble vinyl polymer obtained by polymerizing a monomer mixture of:

(A) a monomer represented by the formula (I):

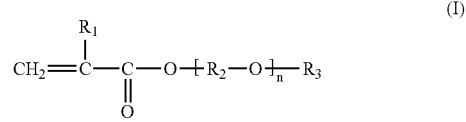

wherein $R_1$ represents a hydrogen atom or a lower alkyl group, $R_2$ represents an alkylene group having 2 to 18 carbon atoms or an alkylene group having 2 to 4 carbon atoms in which a phenyl group is substituted for a hydrogen atom thereof, n denotes a number from 2 to 30 and $R_3$ represents a straight or branched alkyl group having 8 to 30 carbon atoms;
(B) a monomer containing a salt-forming monomer; and
(C) a hydrophobic monomer.

2. The water dispersion according to claim 1, in which the monomer mixture comprises 1~45 wt. % of (A) the monomer represented by the formula (I), 2~50 wt. % of (B) the monomer containing a salt-forming monomer and 10~88 wt. % of (C) the hydrophobic monomer.

3. The water dispersion according to claim 1 or 2, in which the hydrophobic monomer (C) comprises at least monomer selected from the group consisting of (C-1) a monomer having an alkyl group, an aryl group or a cyclic hydrocarbon group, represented by the formula (II):

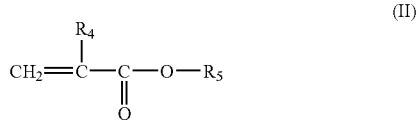

(II)

wherein $R_4$ represents a hydrogen atom or a lower alkyl group, $R_5$ represents an alkyl group having 1 to 22 carbon atoms, an aryl, alkylaryl or arylalkyl group having 6 to 22 carbon atoms or a cyclic hydrocarbon group having 3 to 22 carbon atoms;

(C-2) an aromatic ring-containing monomer represented by the formula (III):

(III)

wherein $R_6$ represents a hydrogen atom or a lower alkyl group, $R_7$ represents an aromatic hydrocarbon group having 6 to 22 carbon atoms; and (C-3) a macromer.

4. The water dispersion according to claim 3, in which the aromatic ring-containing monomer of the formula (III) is at least one selected from the group consisting of styrene, α-methylstyrene, vinyltoluene and vinylnaphthalene.

5. The water dispersion according to claim 3, in which the macromer has a polymerizable functional group at one terminal thereof and a number average molecular weight of 400 to 50,000.

6. The water dispersion according to any of claims 1 to 2, in which the weight average molecular weight of the water-insoluble vinyl polymer is 3,000 to 300,000.

7. The water dispersion according to any of claims 1 to 2, in which the colorant is a pigment or a hydrophobic dye.

8. An aqueous ink for ink jet recording, comprising the water dispersion according to any one of claims 1 to 2.

9. A method for ink jet recording comprising applying the aqueous ink of claim 8 to surface paper.

10. The water dispersion for ink jet recording of claim 1, wherein $R_3$ represents a straight or branched alkyl group having 8 to 22 carbon atoms.

11. The water dispersion for ink jet recording of claim 1, wherein $R_3$ represents a straight or branched alkyl group having 8 to 18 carbon atoms.

12. The water dispersion for ink jet recording of claim 1, wherein $R_3$ is one or more alkyl groups selected from the group consisting of octyl group, 2-ethylhexyl group, decyl group, dodecyl(lauryl) group, tetradodecyl(myristyl) group, hexadecyl(cetyl) group and octadecyl (stearyl) group.

13. The water dispersion for ink jet recording of claim 1, wherein $R_3$ is one or more alkyl groups selected from the group consisting of octyl group, 2-ethylhexyl group, decyl group and dodecyl(lauryl) group.

14. The water dispersion for ink jet recording of claim 1, wherein said water-insoluble vinyl polymer particles have an average particle diameter of 0.01 to 0.50 μm.

15. The water dispersion for ink jet recording of claim 1, wherein a solid content of said polymer particles containing a colorant is from 0.5 to 30 wt. %.

16. The water dispersion for ink jet recording of claim 1, wherein a pH range for said dispersion is from 4 to 10.

17. The aqueous in for ink jet recording of claim 8, further comprising a water-soluble organic solvent in an amount of 0.1 to 50 wt. %.

18. The aqueous in for ink jet recording of claim 8, further comprising a wetting agent in an amount of 0.1 to 30 wt. %.

19. The water dispersion for ink jet recording of claim 1, wherein n denotes a number from 2 to 25.

20. The water dispersion for ink jet recording of claim 1, wherein n denotes a number from 2 to 15.

* * * * *